(12) United States Patent
Rastegar

(10) Patent No.: US 9,423,227 B2
(45) Date of Patent: Aug. 23, 2016

(54) METHOD FOR OPTICALLY TRANSMITTING DATA INTO AND FROM A CASING OF A PROJECTILE

(75) Inventor: Jahangir S. Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 293 days.

(21) Appl. No.: 13/360,771

(22) Filed: Jan. 29, 2012

(65) Prior Publication Data

US 2013/0028607 A1    Jan. 31, 2013

Related U.S. Application Data

(63) Continuation of application No. 12/426,933, filed on Apr. 20, 2009, now Pat. No. 8,110,784, which is a continuation-in-part of application No. 12/206,704, filed on Sep. 8, 2008, which is a continuation-in-part of application No. 11/080,260, filed on Mar. 15, 2005, now abandoned, which is a continuation-in-part of application No. 10/638,996, filed on Aug. 12, 2003, now Pat. No. 6,892,644.

(51) Int. Cl.
| | |
|---|---|
| *F42B 15/01* | (2006.01) |
| *F42B 15/08* | (2006.01) |
| *F41G 7/00* | (2006.01) |
| *F42B 12/36* | (2006.01) |
| *F42B 12/38* | (2006.01) |
| *H04L 12/40* | (2006.01) |
| *F42B 15/00* | (2006.01) |

(52) U.S. Cl.
CPC ............... *F42B 15/08* (2013.01); *F41G 7/007* (2013.01); *F42B 12/365* (2013.01); *F42B 12/382* (2013.01); *F42B 15/01* (2013.01); *H04L 12/40045* (2013.01)

(58) Field of Classification Search
CPC ........ F41G 7/007; F42B 12/02; F42B 12/36; F42B 12/365; F42B 12/38; F42B 12/382; F42B 15/08; F42B 15/01; H04L 12/28; H04L 12/40; H04L 12/40006; H04L 12/40045; H04L 12/44
USPC ......... 244/3.1–3.19; 102/200, 206, 211, 213; 250/336.1, 338.1, 340, 341.1, 200, 250/216; 398/106, 107, 108, 140, 168–172, 398/182, 183, 187; 89/6, 6.5
See application file for complete search history.

(56) References Cited

U.S. PATENT DOCUMENTS

| | | | | |
|---|---|---|---|---|
| 3,228,337 | A * | 1/1966 | Grantham et al. | 398/106 |
| 3,623,045 | A * | 11/1971 | Ouellette | 398/187 |
| 4,091,734 | A * | 5/1978 | Redmond et al. | 89/6.5 |
| 4,134,008 | A * | 1/1979 | de Corlieu et al. | 398/170 |
| 4,207,468 | A * | 6/1980 | Wilson | 250/341.1 |
| 4,325,146 | A * | 4/1982 | Lennington | 398/108 |
| 4,409,900 | A * | 10/1983 | Currie | 102/213 |

(Continued)

*Primary Examiner* — Bernarr Gregory

(57) ABSTRACT

A method for optically transmitting data into and from a casing of a projectile. The method including: transmitting, from an outside of the casing to an inside of the casing, a first optical signal containing first data through a first optical window disposed on the casing; manipulating the first data inside the casing of the projectile into second data; and transmitting, from the inside of the casing to the outside of the casing, a second optical signal containing the second data through a second optical window. The first and second optical windows can be the same optical window or different optical windows.

5 Claims, 4 Drawing Sheets

(56) References Cited

U.S. PATENT DOCUMENTS

| | | | | |
|---|---|---|---|---|
| 4,777,660 A | * | 10/1988 | Gould et al. | 398/170 |
| 5,247,866 A | * | 9/1993 | O'Malley | 89/6 |
| 5,983,771 A | * | 11/1999 | Lehr | 89/6.5 |
| 6,180,938 B1 | * | 1/2001 | Crowther et al. | 250/216 |
| 6,892,644 B2 | * | 5/2005 | Rastegar | H04L 12/44 102/213 |
| 8,110,784 B2 | * | 2/2012 | Rastegar | F42B 12/365 102/200 |
| 8,916,809 B2 | * | 12/2014 | Rastegar | F41G 7/007 102/200 |

* cited by examiner

METHOD FOR OPTICALLY TRANSMITTING DATA INTO AND FROM A CASING OF A PROJECTILE

CROSS-REFERENCE TO RELATED APPLICATION

This application is a Continuation of U.S. application Ser. No. 12/426,933 filed on Apr. 20, 2009, now U.S. Pat. No. 8,110,784, which is a Continuation-In-Part Application of U.S. application Ser. No. 12/206,704 filed on Sep. 8, 2008, now U.S. Pat. No. 8,916,809, which is a Continuation-In-Part Application of U.S. application Ser. No. 11/080,260 filed on Mar. 15, 2005, now abandoned, which is a Continuation-In-Part of U.S. application Ser. No. 10/638,996 filed on Aug. 12, 2003, now U.S. Pat. No. 6,892,644, the entire contents of each of which is incorporated herein by reference.

BACKGROUND OF THE INVENTION

1. Field of the Invention

The present invention relates generally to projectiles, and more particularly, to projectiles having a window on a portion of the casing of the projectile for transmitting data and/or power through said window. For purposes of this disclosure, a projectile is any flying object, such as munitions, rockets, or aircraft.

2. Prior Art

Projectiles typically have a casing or shell in which electronic/electrical components are housed. Transmitting data and/or power to and/or from the projectile prior to firing thereof may be a cumbersome process, particularly where the projectile has had a relatively long shelf life.

SUMMARY OF THE INVENTION

Accordingly, a projectile is provided. The projectile comprising: a casing; first and second windows provided on the casing for at least one of transmitting a first optical signal into an interior of the casing and transmitting a second optical signal from the interior of the casing; a receiving element disposed on the interior of the casing and in optical communication with one or more of the first and second windows for at least one of converting the first optical signal into electrical energy and storing data provided in the first optical signal; and a transmitting element disposed on the interior of the casing and in optical communication with one or more of the first and second windows for transmitting data provided in the second optical signal to outside the casing.

The first and second windows can be provided in a nose portion of the projectile.

At least one of the first and second optical signals can be a laser.

The receiving element can be a thermophotovoltaic cell.

The projectile can further comprise one or more electronic components disposed within the casing and operatively connected to the receiving element, wherein the receiving element provides the electrical energy to the one or more electronic components.

The projectile can further comprise an energy storage medium disposed within the casing and operatively connected to the receiving element, wherein the receiving element provides the electrical energy to the energy storage medium. The storage medium can be one of a capacitor and battery.

Also provided is a method for transmitting power and data into and from a casing of a projectile. The method comprising: transmitting a first optical signal for conversion into electrical energy into the casing of the projectile through a first optical window disposed on the casing; and transmitting a second optical signal containing data from the casing through a second optical window disposed in the casing.

The method can further comprise transmitting a third optical signal containing data into the casing for storage in the casing through the second optical window.

The method can further comprise transmitting a third optical signal containing data into the casing for storage in the casing through the first optical window.

The method can further comprise transmitting a fourth optical signal for conversion into electrical energy from the casing through the second optical window.

Still further provided is a method for transmitting power and data into and from a casing of a projectile. The method comprising: transmitting a first optical signal containing data into the casing of the projectile through an optical window disposed on the casing; and transmitting a second optical signal containing data from the casing through the optical window.

The method can further comprise transmitting a third optical signal for conversion into electrical energy into the casing of the projectile through the optical window.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although the invention is particularly suited to infra-red or optical signal communication between electronic components, such is discussed by way of example only. Those skilled in the art will appreciate that other communication means can also be utilized, such as ultrasound.

Figure 1:
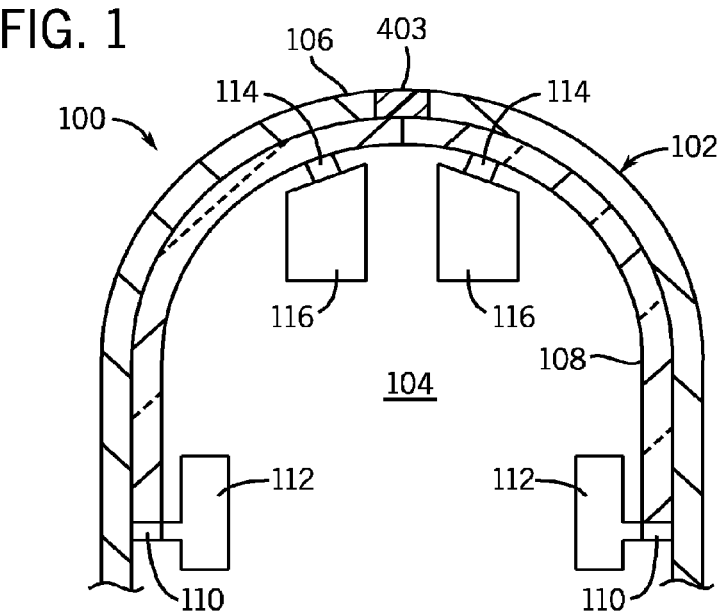
FIG. 1 illustrates a partial sectional view of a nose portion of a projectile according to an embodiment of the present invention.

Referring now to FIG. 1, there is shown a partial sectional view of a nose section of a projectile 100. The projectile has a shell 102 that defines an interior 104. The shell preferably has a metal or composite outer portion 106 and an inner waveguide portion 108. The inner waveguide portion 108 is preferably optical glass having appropriate cladding as is known in the art, however, other at least partially transparent materials such as plastics capable of transmitting a signal can also be utilized, such as clear epoxies. The waveguide portion 108 can be disposed on the entire inner surface of the outer portion 106 or only a portion thereof, such as a strip. Alternatively, the waveguide portion 108 can make up the entire shell 102 (no outer portion 106 is used). Still further the waveguide portion 108 can be disposed in strips which can be formed on an inner surface of the casing 102 or in channels (not shown) formed on the inner surface of the casing 102, such as that disclosed in co-pending U.S. application Ser. No. 10/639,001, filed on the same day herewith and entitled Device Having A Casing and/or an Interior Acting As A Communication Bus Between Electronic Components, the entire contents of which is incorporated herein by its reference. For purposes of this disclosure, "casing" includes not only the shell of the projectile but the internal space therein.

At least one transmitter 110 is arranged on the waveguide portion 108 or proximate thereto such that an optical signal can be transmitted to the waveguide portion 108. The transmitter 110 can be integral with a corresponding electronic component 112 or connected thereto. At another location on the waveguide portion 108 are located detectors 114 for detecting the optical signals in the waveguide portion 108. Each detector 114 is either integral with or connected to another electronic/electrical component 116. Thus, those skilled in the art will appreciate that any component can communicate with another component through the waveguide portion 108, which acts as a communication bus. Of course, each of the components can have both a transmitter 110 and detector 114 such that a two-way communication can be achieved. Although not shown, multiplexers and demultiplexers can be used such that certain components can operate at selected frequencies and/or wavelengths and not interfere with other components on the bus. The components, such as the transmitter 110 and detector 114 can be fastened to the waveguide portion 108 in a number of ways, such as those also disclosed in co-pending U.S. application Ser. No. 10/639,001, filed on the same day herewith) entitled Device Having A Casing Acting As A Communication Bus Between Electronic Components, the entire contents of which has incorporated herein by its reference.

Those skilled in the art will also appreciate that the interior is not cluttered with components and internal wiring resulting in more components being able to occupy a given interior size or the projectile 100 being made smaller than a conventional projectile having the same number of internal components. Other advantages include:

- The optical transmission provides robust, interference free channels between physically disconnected components/systems;
- The optical transmission is naturally resistant to very high g-loads and harsh environments;
- For shorter distances between the transmitter and receiver encountered in projectiles, the system is inexpensive and an extremely low bit rate error (better than $10^{-12}$) can be readily achieved; and
- Eliminates the need for wires and related problems and space requirements.
- Ease of assembly because two parts can be attached or even screwed together easily, which is very difficult with wires running from one part to the other.

Alternatively, ultrasound can be used to communicate between the internal components. In which case, the shell or a portion thereof needs to be able to carry an ultrasound signal between components. Such a shell, or portion thereof, may be constructed from a suitable metal. In the case of ultrasound, an ultrasonic generator is used to place signals on the "bus" (shell) and a corresponding ultrasonic detector detects the ultrasonic signals and relays them to an appropriate component. As discussed above with regard to the optical signal configuration, each component can have both an ultrasonic generator and detector such that two-way communication between components is possible and multiplexers and demultiplexers can be utilized such that certain components can operate at selected frequencies and/or wavelengths and not interfere with other components on the bus.

Figure 2:
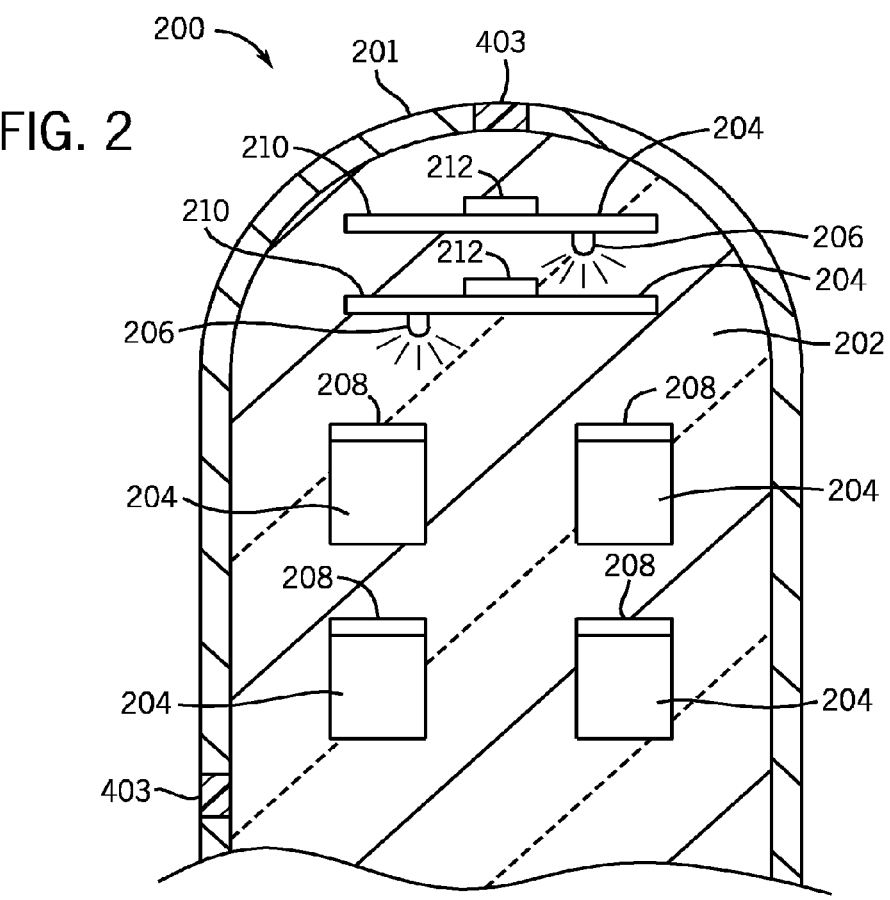
FIG. 2 illustrates a partial sectional view of a nose of a projectile according to another embodiment of the present invention.
Figure 3:
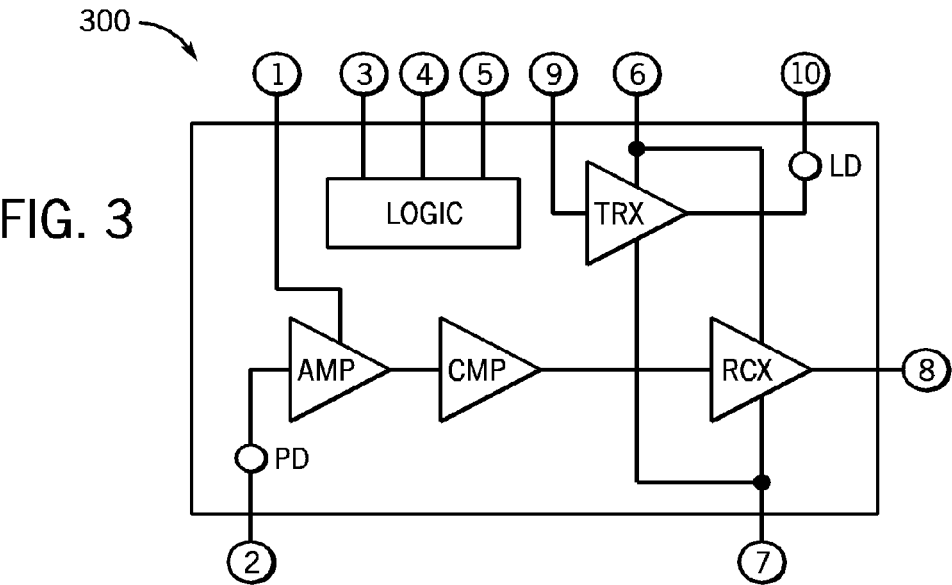
FIG. 3 illustrates a schematic electrical diagram of an infrared (IR) transceiver for use with the projectile of FIG. 2.

Referring now to FIGS. 2 and 3, another embodiment of a projectile is shown, the projectile being referred to generally by reference numeral 200. Typically, electrical/electronic components of projectiles are encased in a potting material, such as an epoxy, to harden the components against noise and shock due to the high acceleration and/or impact experienced by the projectiles. In the embodiment of FIGS. 2 and 3, the potting material 202, which can be a solid, such as an epoxy, a gel, or a liquid is disposed within a casing 201 of the projectile and is used as a communication bus between electrical/electronic components 204. The communication can be wholly within the potting material 202 or may be partially within the potting material 202 and partially in free space. The communication through the potting material is carried out with a transmitter 206, which outputs any wavelength radiation that can propagate through the potting material 202 and be detected by a receiver 208. It is preferred that the potting material 202 be a solid, such as an epoxy to provide hardening of the projectile to shock and noise and it is further preferred that the radiation used as a communication medium is IR energy, preferably from a IR diode. In such an example, the epoxy need not be transparent or substantially transparent as long as it can carry an IR signal over a required distance, such as several hundred mm or less. An example of such an epoxy is Dolphon® CC-1024-A Low Viscosity Potting and Casting Epoxy Resin with RE-2000 Reactor mixed at a ratio of 10 parts resin to 1 part reactor, each of which is distributed by John C. Dolph Company. The same epoxy resin and reactor can be used for the waveguide portion 108 discussed above with regard to FIG. 1.

IR technology is well known in the art, particularly in the art of remote control of electronic consumer goods. The IR data association (IrDA®) has standards for communicating data via short-range infrared transmission. Transmission rates fall within three broad categories SIR, MIR and FIR, SIR (Serial Infrared) speeds cover transmission speeds normally supported by an RS-232 port. MIR (Medium Infrared) usually refers to speeds of 0.576 Mb/s to 1.152 Mb/s. FIR (Fast Infrared) denotes transmission speeds of about 4 Mb/s. The standard has been modified for faster transmission speeds up to 16 Mb/s (referred to as very fast Infrared VFIR). Although not preferred, visible light, for example from a laser diode, may also be used to transmit communication signals through the potting material 202.

The transmitters 206 may be carried on printed circuit boards 210 which may also be encased in the potting material 202 or disposed freely throughout the potting material 202. The printed circuit boards each 210 preferably carry their own power supply, such as a battery 212 to eliminate internal wiring. Alternatively, the batteries may be charged as discussed below through the casing 201 by directing energy into the casing 201 with a charging cap. Each of the electronic/electrical components 204 has a receiver 208 for communicating with the transmitters 206. As discussed above with regard to the first embodiment, each of the electrical/electronic components 204 preferably have a receiver 208 and a transmitter 206 such that they can carry out a two-way communication. An example of such a transceiver module 300 is shown in the schematic diagram of FIG. 3. FIG. 3 shows an (IrDA®) transceiver manufactured by Sharp Inc. (2P2W1001YP) which is relatively inexpensive and contains a high speed, high efficiency low power consumption light emitting diode (LD), a silicon PIN photodiode (PD) and a low power bipolar integrated circuit. The circuit contains an LED driver (TRX) and a receiver circuit (RCX) that delivers 4 Mb/s operation for distances of 1 meter. The LED emitter transmits at a nominal wavelength of 880 nm with a radiant intensity in the range of 100 to 500 $mW.sr^{-1}$, with a radiation angle of +/−15 degrees. The pin photodiode has an integrated amplifier (AMP) and comparator (CMP), which provide a fixed voltage output over a broad range of input optical power levels and data rates. The same or similar transceiver module 300 can also be used for the other embodiments described above with regard to FIG. 1.

The casing 102 can also be provided with a window portion 403, as shown in FIGS. 1 and 2, which can be used to upload or input data or instructions into components of the projectile through the waveguide portion 108 or potting material 202. In a preferred implementation, the window portion 403 is in optical communication with the waveguide portion 108 or potting material 202 and transmits any input signals to the appropriate components on the interior of the projectile. Although described in terms of a transparent window 403 and signal, the input signal can be any signal that propagates through the waveguide portion 108 or potting material 202, such as an IR or ultrasound signal. Furthermore, the window 403 does not have to be a transparent window but merely a portion of the shell, which is capable of transmitting a signal from the exterior of the projectile to one or more components on the interior of the projectile. Although the window 403 is shown on the tip of the nose and on a lower side of the casing, those skilled in the art will appreciate that the window 403 may be located anywhere on the casing of the projectile.

The window 403 can also be utilized to partially power a capacitor, rechargeable battery, or electric power storage device in the interior of the projectile, particularly for the purpose of transmitting required data. Thus, a power storage device can be charged, at least partially, thru the window 403 to enable transfer of data. The charging signal transmitted through the window may be modulated to transmit data as well.

Figure 4:
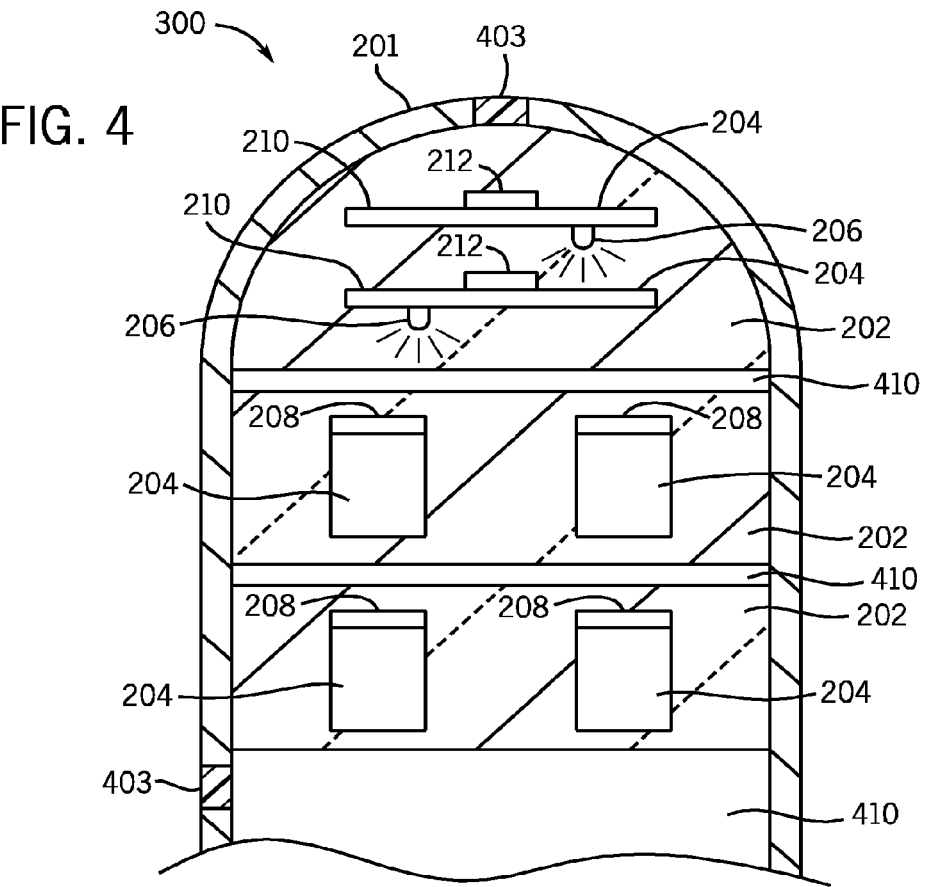
FIG. 4 illustrates a projectile according to another embodiment of the present invention.

Referring now to FIG. 4, there is shown a projectile according to another embodiment of the present invention, in which similar reference numerals from FIG. 2 denote similar features, the projectile of FIG. 4 being referred to generally by reference numeral 300. FIG. 4 is similar to that of FIG. 2 with the exception that the potting material does not have to completely encase a portion of the projectile's interior. The interior of the projectile includes portions of free space 410 (which may be filled with air or other gases or may be evacuated. Although all of the components 204, 208 are shown encased in the potting material 202, they can also be provided in the free space 410 or partially in the free space 410. Thus, the communication between components is not only through the potting material 202 but can also be done through the free space 410 inside the projectile. The embodiment of FIG. 4 is particularly suitable for wireless sensor communication where the use of wire harnesses is highly cumbersome and expensive and subject to harsh environments. One can, for example send a signal from a sensor mounted on one part of a component to another without wires and without generating RF noise.

Figure 5:
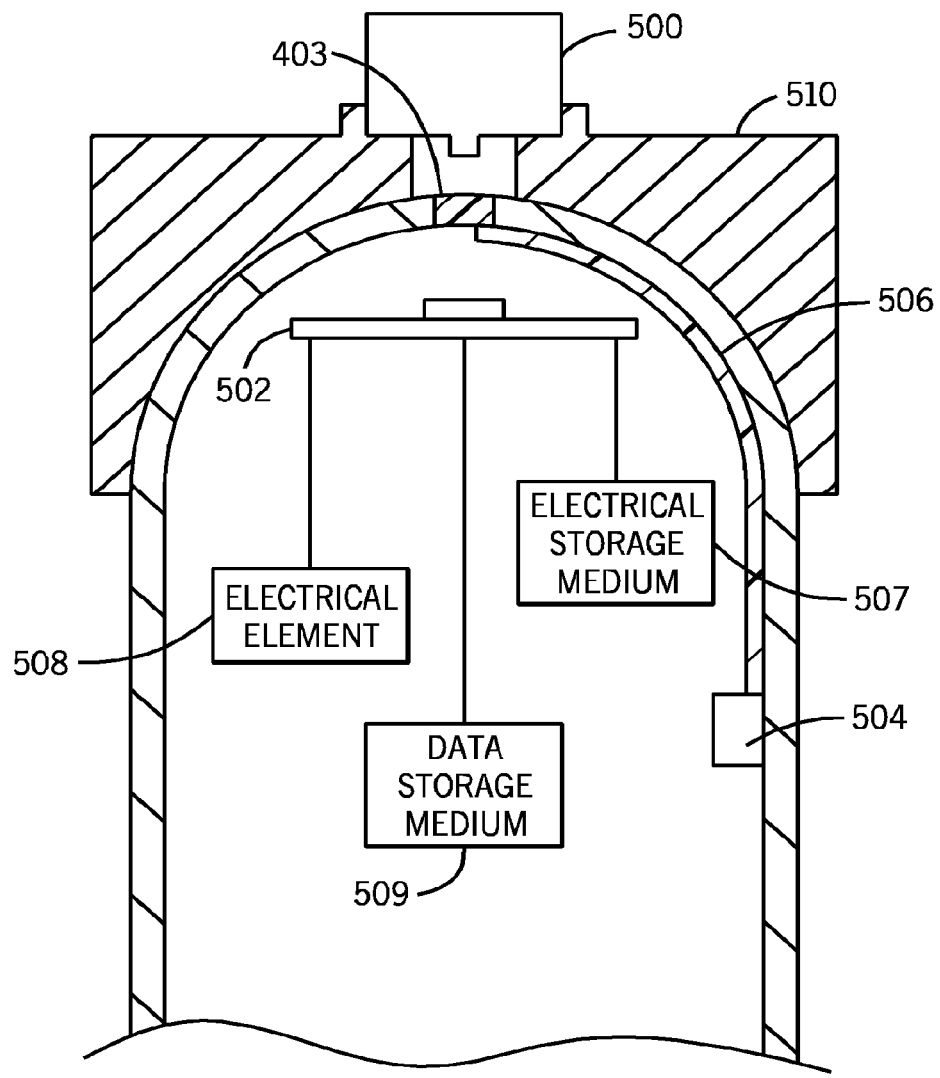
FIG. 5 illustrates a projectile according to another embodiment of the present invention.

Referring now to FIG. 5, the window 403 may also be used for transmitting power optically from an external source 500 to a receiving element 502 inside the casing or a receiving element 504 on the casing via a bus 506. The optical source 500 can be a laser (or other relatively high optical signal) and the receiving element 502, 504 can be a thermophotovoltaic (TPV) cell or the like that is tuned to efficiently transform the laser energy to electrical energy. The generated electrical energy may then be used directly by the electronic elements 508 within the projectile or stored in an electrical storage medium 507 such as a capacitor or rechargeable battery. The TPV and laser technology used for such a purpose is well known in the art.

Hereinafter, the optical source 500 used for optically transmitting power from an exterior source into the casing is generally referred to as a "charging laser source" and the receiving element 502, 504 is generally referred to as a "TPV cell".

Alternatively, at least one additional window may be used for transmitting the aforementioned laser (or other relatively high energy optical) signal to the aforementioned receiving element.

The window through which the aforementioned laser may be integral to the structure of the casing and be at least partially transparent to the transmitted optical energy.

In addition, the same optical (such as laser) source used to transmit energy into the casing may be modulated to also transmit data into the interior of the housing. The modulated signal can be received by the same optical energy to electrical energy conversion device (preferably the aforementioned TPV cells) and then passed to the interior electronics 508 or a data storage medium 509 directly or through an existing communications bus.

Also provided is an intermediate means of aligning the charging laser source 500 with the casing window 403. The intermediate means can be designed for rapid placement and removal, self-align the laser source with the provided casing window, does not require a person to hold it in place during charging, and provides a level of safety by ensuring that laser light is confined in the window area and that it would not transmit into free space to cause damage to equipment or injury to those around.

The intermediate means can be a "cap" 510 that is placed on the nose of the projectile. The window 403 is preferably on the tip of the projectile such as window 403 shown in FIG. 5 to simplify the alignment task. When the window cannot be provided on the tip of the projectile, it is preferably still provided on the nose area so that a "cap" can still be used for the case of ease of placement and removal. The cap and nose contact surfaces can be provided with the alignment features that ensures proper alignment of the laser source with the window. Safety switches can also be provided such that if the cap is not properly positioned on the projectile nose, the laser power is not switched. In place of the electrical switch to power the laser beam and in addition to the electrical switch, mechanical means can also be provided to block the laser beam if the cap is not properly positioned on the nose of the projectile.

It is appreciated by those familiar with the art that the aforementioned intermediate means may be designed to similarly align the laser beam with one or more windows positioned almost anywhere on the surface of the casing. The intermediate means may then be clamped to the projectile or held by magnets of elastic bands or springs or even manually or using other means of temporary attachment known in the art.

Figure 6:
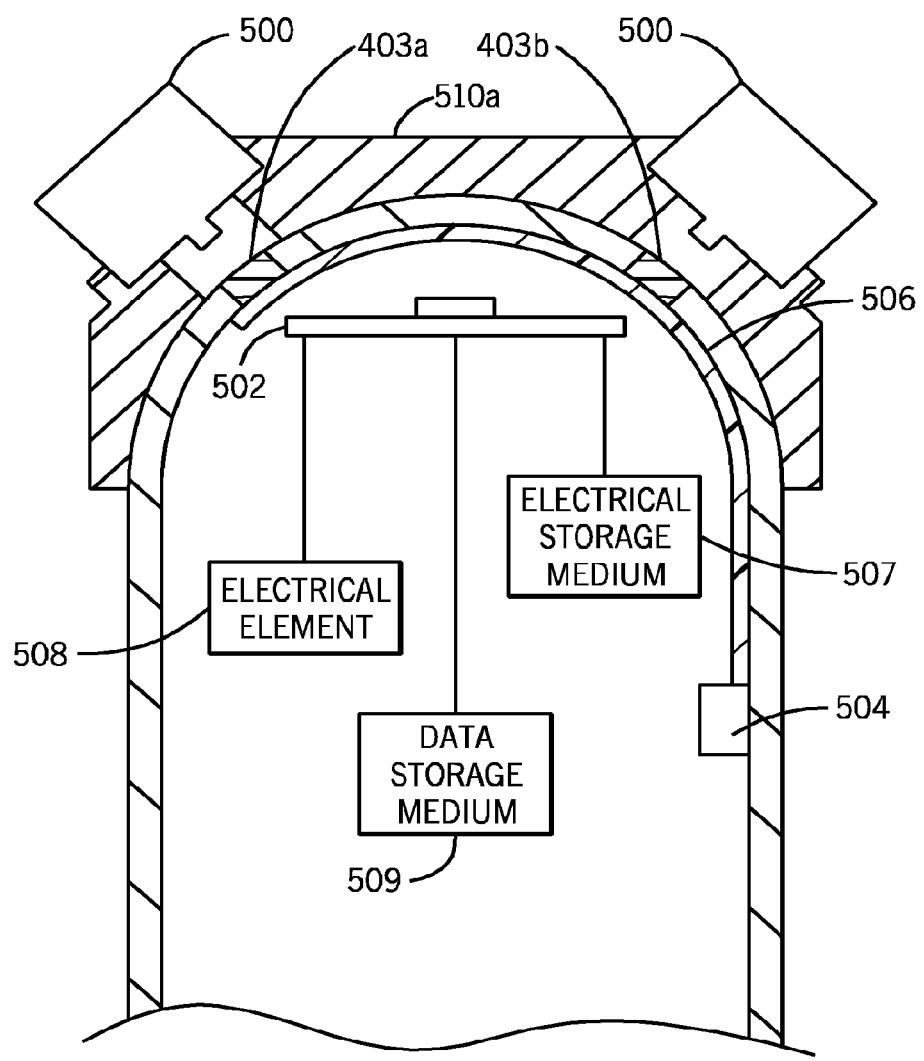
FIG. 6 illustrates a projectile according to another embodiment of the present invention.

In another embodiment, as shown in FIG. 6, first and second windows 403a, 403b are provided on the projectile casing, each corresponding to an IR transceiver 500 (as discussed above). Similar to that shown in FIG. 5, a cap 510a may be provided on the nose of the projectile to align the transceivers 500 with their respective windows 403a, 403b.

In the configuration of FIG. 6, power can be transmitted into the projectile through the first window as discussed above and data can be transmitted into and/or out of the casing through the second window 403b using the aforementioned IR transceivers 500. Those skilled in the art will appreciate that other data/power transfers into and out from the casing through combinations of the first and second windows are possible. For example, data can be transmitted into the casing through the first window 403a and data transmitted out of the casing through a second window 403b by the IR transmitters 500. In this configuration, the rate at which that data can be transmitted in and out of the casing can be significantly increased. Alternatively, power can be transmitted into the casing through one of the windows 403a and power can be transmitted from the casing through the other window 403b. Of course, a single window (403, 403a or 403b) can be utilized to transmit power into the projectile and transmit data into and out from the projectile.

The transceivers 500 positioned outside of the casing can be connected directly to the communications bus 506 provided within the casing. In the case where data is transmitted from the casing through one of the windows 403, 403a, 403b, a transmitting element can be disposed on the interior of the casing and in optical communication with one or more of the first and second windows, such as on the communication bus 506, for transmitting data to outside the casing. Such a transmitter can be the receiving element 504 operating as a transmitter.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for optically transmitting data into and from a casing of a munition, the method comprising:
   aligning a first optical signal with a first optical window portion disposed on the casing, the first optical window portion being formed of a material which allows passage of the first optical signal from an outside of the casing to an inside of the casing by optically passing the first optical signal through the first optical window portion;
   transmitting, from the outside of the casing to the inside of the casing, the first optical signal containing first data through the first optical window portion disposed on the casing;
   manipulating the first data inside the casing of the munition into second data; and
   transmitting, from the inside of the casing to the outside of the casing, a second optical signal containing the second data through a second optical window portion, the second optical window portion being formed of a material which allows passage of the second optical signal from the inside of the casing to the outside of the casing by optically passing the second optical signal through the second optical window portion.

2. The method of claim 1, further comprising transmitting a third optical signal for conversion into electrical energy into the casing of the munition through one or more of the first and second optical window portions.

3. The method of claim 1, wherein the first and second optical window portions are the same optical window.

4. The method of claim 1, wherein the first and second optical window portions are different optical windows.

5. The method of claim 1, wherein the one or more of the first optical window portion and the second optical window portion are disposed on a nose portion of the munition.

* * * * *